United States Patent [19]

Huignard et al.

[11] Patent Number: 4,639,091
[45] Date of Patent: Jan. 27, 1987

[54] STATIC DEFLECTOR DEVICE FOR AN INFRARED BEAM

[75] Inventors: Jean-Pierre Huignard; Marcel Malard; Guy de Corlieu, all of Paris, France

[73] Assignee: Thomson-CSF, Paris, France

[21] Appl. No.: 583,645

[22] Filed: Feb. 27, 1984

[30] Foreign Application Priority Data

Feb. 25, 1983 [FR] France ............... 83 03132

[51] Int. Cl.$^4$ .................. G02F 1/137; G02B 5/18
[52] U.S. Cl. ..................... 350/347 V; 350/162.24; 350/348
[58] Field of Search ............. 350/348, 332, 162.24, 350/347 V

[56] References Cited

U.S. PATENT DOCUMENTS

| | | | |
|---|---|---|---|
| 3,758,195 | 9/1973 | Hedman et al. | 350/348 |
| 3,843,231 | 10/1974 | Borel et al. | 350/348 |
| 3,904,114 | 9/1975 | Haas et al. | 350/162.24 |
| 4,036,553 | 7/1977 | Borel et al. | 350/332 |
| 4,065,334 | 1/1978 | Fray et al. | |

FOREIGN PATENT DOCUMENTS

2134160 12/1972 France .
2254057 7/1975 France .

OTHER PUBLICATIONS

Yao et al., "Chirp Grading Lens for Guided Wave Optics" Appl. Phys. Lett: 33(7) Oct. 1, 1978 pp. 635–637.

Primary Examiner—John K. Corbin
Assistant Examiner—David Lewis
Attorney, Agent, or Firm—Oblon, Fisher, Spivak, McClelland & Maier

[57] ABSTRACT

The diffraction grating principle is used to deflect an infrared beam in a series of discrete predetermined directions. A periodic control voltage having a staircase waveform with N steps is applied across a liquid crystal layer to create local variations of refractive index therein, thereby setting up an infrared diffraction grating of adjustable pitch.

15 Claims, 10 Drawing Figures

STATIC DEFLECTOR DEVICE FOR AN INFRARED BEAM

BACKGROUND OF THE INVENTION

Field of the Invention

The present invention relates to a device for deflecting a polarized infrared beam in a series of discrete predetermined directions, by means of a diffraction grating.

DISCUSSION OF BACKGROUND

To deflect a beam of radiated energy with high accuracy, it is generally preferable to use a device operating at discrete values which may themselves be defined by the actual structure of the device. This improves stability, ie. reduces sensitivity to external fluctuations or disturbances.

A diffraction grating provides overall reflection of an incident beam in a predetermined privileged direction which is symmetrical about the normal to the grating plane. Such a grating thus deflects an incident beam only in two symmetrical predetermined directions. In order to make a device capable of successively deflecting a beam along a plurality of defined directions, it is thus necessary to associate a plurality of gratings with the resulting drawbacks of loss of light efficiency on deflection and above all of loss of accuracy.

A prior art device is described in French published patent specification No. 2 254 057. This device is a device for deflecting a beam of coherent and polarized radiated energy under the control of an electrical control signal, and it comprises: a layer of electro-optical material; electrodes on each of the faces of said layer, with the electrodes of at least one of the faces being transparent; and electrode excitation means for receiving the control signal. One of the faces of the layer has a set of electrodes of equal length which are contiguous but electrically isolated from one another, and which are selectively raised to electric potentials of predefined values thereby spacially modifying the degree of phase shift applied to an incident beam and thus constituting the lines of a diffraction grating. The spacing of the grating is variable as a function of the predefined potentials applied to the electrodes.

Preferred embodiments of the present invention provide an improved beam deflector device capable of deflecting an infrared beam to a randomly selected point over a given area.

SUMMARY OF THE INVENTION

The present invention provides a static deflector device for deflecting a polarized infrared beam, said device being for use with a source for a polarized infrared beam, and comprising:

deflector means for deflecting said beam, said deflector means comprising a liquid crystal layer and modulator means for modulating said liquid crystal layer; and control signal generator means for generating a control signal and applying said control signal to said modulator means, thereby creating local variations of refractive index in said layer in such a manner as to form a beam diffraction grating of adjustable spacing in said liquid crystal layer;

said control signal being periodic in space having a staircase waveform varying from a minimum value to a maximum value in a continuous progression of N steps per period in such a manner that the maximum value causes an incident beam to be phase-shifted by $2\pi$;

said modulator means for modulating said liquid crystal layer comprising electrodes disposed on both faces of said layer, the electrodes on the incident face of the layer being transparent, electrically isolated, and disposed in zones that are equidistant from one another and which are separated by interelectrode spaces which, at least in one direction are 1 to 10 micrometers in size, a common electrode being disposed on the other face of said liquid crystal layer.

Unlike the above-mentioned prior art device, the present invention seeks to deflect a polarized beam which lies in the infrared. This is because opto-electrical devices working in the mid infrared, and in particular in the 9.5 $\mu$m to 10.6 $\mu$m band in which the carbon dioxide laser operates, are being put to an expanding range of applications, thereby creating a requirement for a deflector device which operates at high speed, ie. a device which is itself static, to deflect a beam providing random access to any selected point over a given arc of deflection.

A deflection device in accordance with the present invention uses the property of liquid crystals which enables local variations in refractive index to be obtained as a function of the applied electric field. This property thus makes it possible to use a liquid crystal sheet lying between two sets of suitably disposed electrodes to create a grating in which the spacing and the direction of the lines can be rapidly modified at will. Preferred embodiments of the invention can thus be used to provide two-dimensional scanning to obtain random access to any point in a scanned frame. Such a device can be used, in particular, for "chess knight" type scanning, ie. jumping directly from any starting point to any subsequent point chosen at random anywhere in the frame.

Finally, preferred embodiments the invention can be used to deflect a fairly large beam. Further, while efficiency is limited to 30% in a linear prior art structure which varies from 0 to $\pi$, it is about 80% when using a control signal of the type provided by the present invention, ie. a periodic staircase waveform varying from 0 to $2\pi$ with N steps per period.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

The present invention makes use of the electro-optical effect for setting up a diffracting phase structure of the index grating type in the active material. In theory, the active material could be any electro-optical crystal, however most crystals used in this manner have rather small electro-optical coefficients, particularly at long wavelengths.

One of the characteristics of the present invention lies in the use of a special type of electro-optical material, namely liquid crystals. Diffusion loss is low, residual absorption is low, and the natural high degree of anisotropy of the medium gives rise to very high electro-optical coefficients. These desirable features are applicable at the infrared wavelength of interest, namely 10.6 μm.

Figure 1:
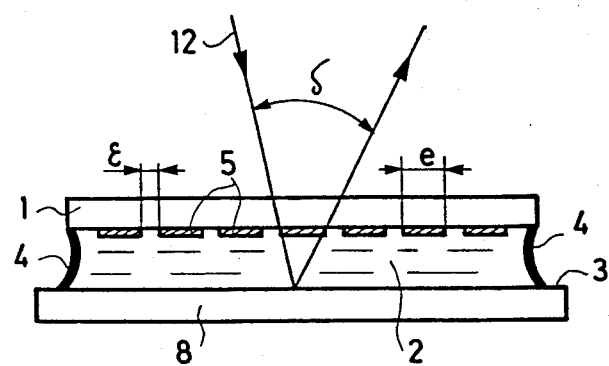
FIGS. 1 and 2 show one embodiment of deflector means for use in a deflector device in accordance with the invention.
Figure 2:
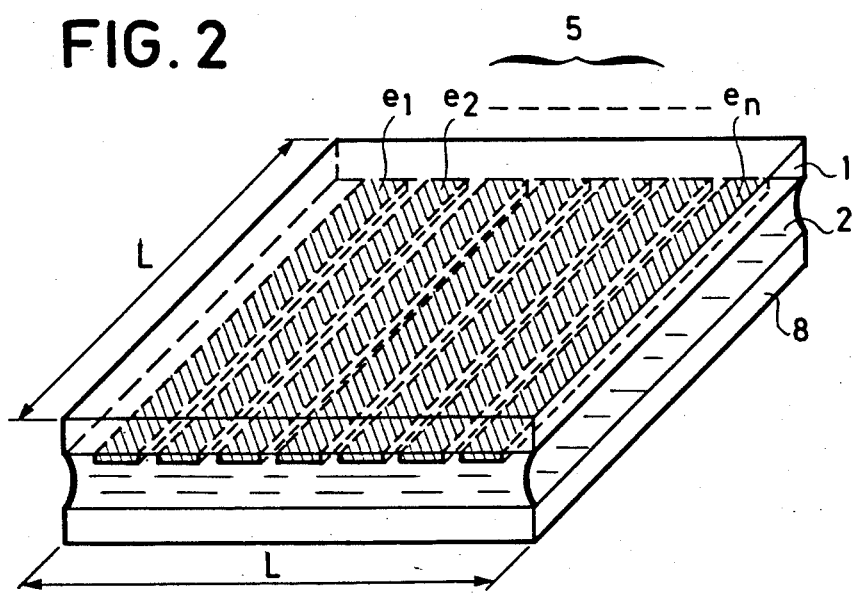

FIGS. 1 and 2 are views of one embodiment of deflector means for use in a deflector device in accordance with the present invention, and the views are highly diagrammatic in order to facilitate understanding.

The deflector means shown is in the form of a layered square plate of side L having a front layer in the form of a window 1 on which strip electrodes $e_0$ to $e_n$ are disposed. The window 1 is transparent to a polarized beam of incident radiation 12. For example, when using a wavelength of 10.6 μm, the window may be made of zinc selenide (ZnSe). The electrodes $e_0$ to $e_n$ are also be transparent to the incident radiation, and may be made of germanium (Ge) and shaped by photolithography, for example.

An electro-optical liquid crystal layer 2 constitutes a middle layer adjacent to the window 1, and its sides are enclosed by electrically insulating spacers 4 which may be made of mylar, for example.

A common electrode 3 which is preferably reflective at the working wavelength is immediately adjacent the liquid crystal layer 2. The electrode 3 may be constituted by a film of gold deposited on a substrate 8. Alternatively, a transparent rear plate may be used, in which case the deflector means will operate by transmission.

The liquid crystal layer 2 trapped between the front window 1, the rear electrode 3, and the insulating spacers 4 is in the form of a sheet having parallel plane faces.

Figure 3:
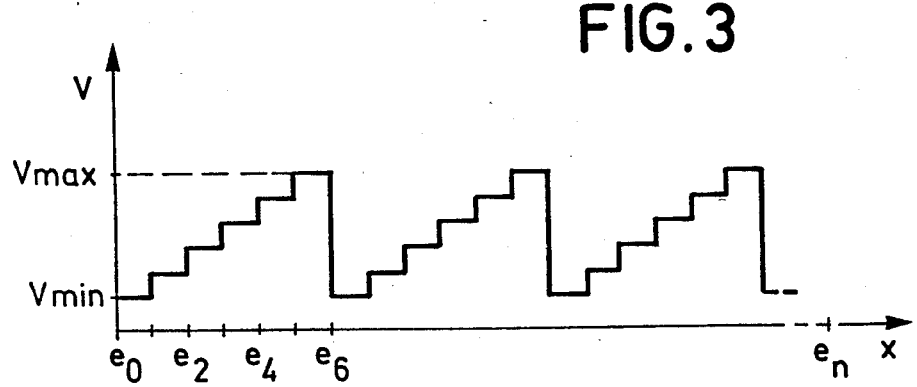
FIGS. 3 to 9 are diagrams for explaining various aspects of the deflector device in accordance with the invention.
Figure 4:
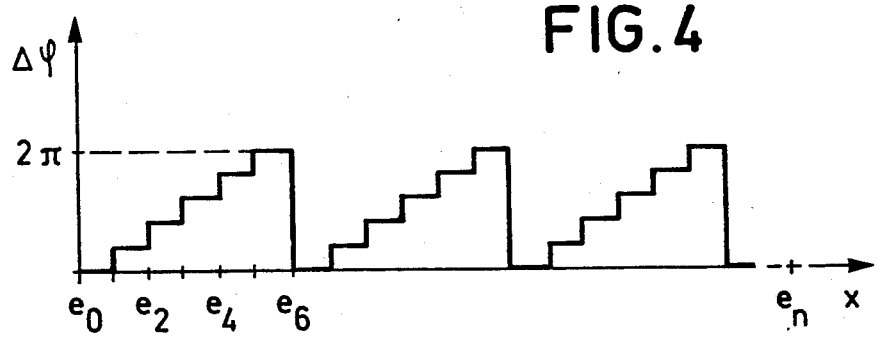

FIG. 3 shows a periodic staircase waveform comprising N voltage steps (where N is an integer) between a minimum value and a maximum value. If such a waveform is applied to the electrodes of the deflector means shown in FIGS. 1 and 2, the refractive index of the liquid crystal layer is caused to vary in steps Δn, thus imparting phase shifts Δϕ on the plane of the incident beam 12. The resulting phase ϕ is plotted in FIG. 4.

$\Delta\phi = (2\pi/\lambda)\cdot d\cdot \Delta n$ whence
$\Delta\phi = (2\pi/\lambda)\cdot r$ where
d = thickness of the layer, and
r = electro-optical coefficient.

Each distribution of potentials $V_n$ thus corresponds to a particular direction of constructive interference. In practice there will be only a single or unique such direction if the electrode spacing is small enough and if the distribution of the steps Δϕ within the index grating spacing is suitably chosen. The electrodes may be 5 to 25 micrometers wide for example, and the interelectrode spacing may be about 5 micrometers.

The resulting reflection angle δ is given by
$\delta \approx \lambda/\Lambda$ where
λ = incident wavelength, and
Λ = staircase cycle length Optimum diffraction efficiency in the first order direction is obtained if the amplitude of the phase shift at the top of the staircase is equal to $2\pi$.

In such a grating of spacing Λ which is sampled in N discrete steps (where N is an integer), the diffraction efficiency is given by the relationship:

$$\eta = \left(\frac{\sin(\pi/N)}{\pi/N}\right)^2$$

Figure 5:
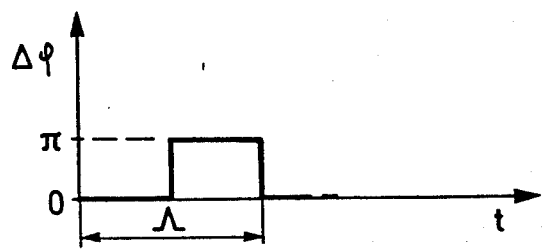

In a binary grating N=2, in which case the staircase waveform degenerates to the squarewave shown in FIG. 5 and:

$$\eta = 4/\pi^2 \approx 40\%$$

Figure 6:
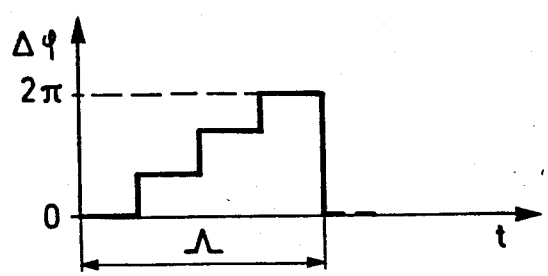

In a grating for which N=4, a four step staircase waveform as shown in FIG. 6 is used, giving $$\eta = 8/\pi^2 \approx 80\%$$

In order to maintain high first order diffraction efficiency, distribution at the rate N=4 is chosen. This gives a small spacing grating in which:

$$(\Lambda)_{Min} = 4(e + \epsilon)$$

together with a maximum spacing grating in which:

$$(\Lambda)_{Max} = L/100$$

In other words 50 diffracting strata are chosen, for example, in the dimension L.

Figure 7:
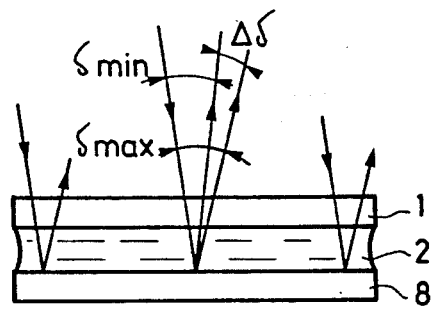

FIG. 7 shows the corresponding angular deviation:

$$\Delta\delta = \lambda\left[\frac{1}{(\Lambda)_{Min}} - \frac{1}{(\Lambda)_{Max}}\right]$$

$$\Delta\delta = \lambda\left[\frac{1}{4(e + \epsilon)} - \frac{100}{L}\right]$$

thus giving N independent positions:
$N = \Delta\delta/\Delta\epsilon$; where Δϵ is the diffraction angle.
$\Delta\epsilon \approx \lambda/L$ $$\rightarrow N = L\left[\frac{1}{4(e + \epsilon)} - \frac{100}{L}\right]$$

and with e=20 μm; ϵ=5 μm; and L=60 mm,
=> N=500

The device described thus provides 500 independent directions as defined by the Rayleigh criteron, which amounts to about 100 usably distinct directions.

Figure 8:
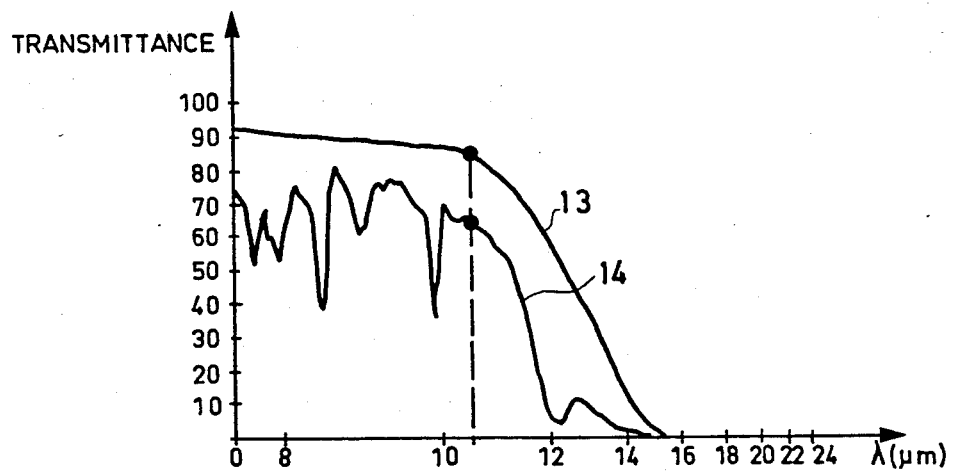

FIG. 8 shows, by way of example, the infrared transmission spectrum of a 25 μm thick liquid crystal cell. The curve 13 was obtained without any liquid crystal layer, while the curve 14 was obtained with an included layer of P.C.B. or Pentyl-CyanoBiphenyl.

Average transmission at 10.6 μm is 70%
Control voltage is about 40 V.

The window of the cell is treated to obtain homogenous molecule alignment (either in parallel or twisted at 90°). The response times of such cells are typically 10 to 100 ms. The response time can be improved by optimizing certain parameters such as the structure of the liquid crystal, its viscosity, and the operating temperature.

It is naturally quite possible to assemble two deflector means as shown in FIG. 1 so that they have their control electrodes at 90° to each other. If both deflector means operate in transmission, then they may be stuck together. The resulting assembly can then provide two-directional X-Y deflection of an incident beam.

However, a more compact arrangement is possible. Instead of using strip electrodes $e_0$ to $e_n$, a matrix of individually addressable points could be used. It is then possible to distribute the applied potentials in such a manner as to modify both the pitch and the direction of the lines at will. This phenomenon can also be used to provide two-dimensional X-Y scanning.

In such a case, the control signals are phase shifted regularly from one line of point electrodes to another. However, they always have the same period which makes it possible to modify the direction of the grating lines. In this case, the deflector means may work by reflection with a reflecting common electrode 3 or it may work by transmission with a transparent electrode 3.

Another way of imparting a voltage distribution to the liquid crystal is to use optical access by way of a photoconductor. A liquid crystal optical photoconductor valve may be used for this purpose.

One way of controlling the light transmitted or reflected by a nematic liquid crystal is to use the birefringence phenomenon. However, by adding a small amount of cholesteric material to the nematic material, a mixture is obtained which has memory. The application of an AC voltage at a higher frequency than the control voltage returns the mixture to its initial transparent state.

Figure 9:
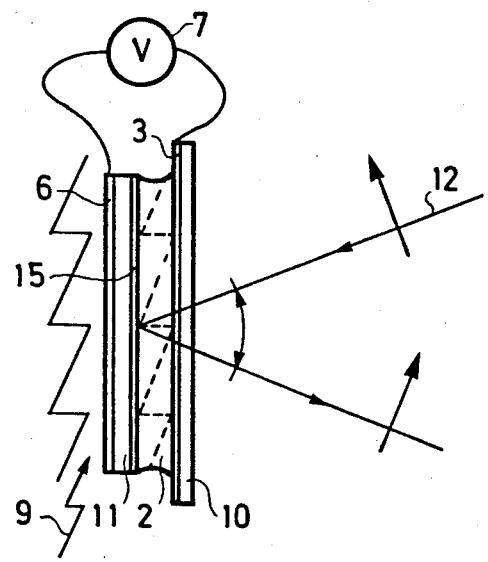

FIG. 9 shows an optical valve operating by reflection and comprising a liquid crystal layer 2, a sheet 11 of photoconductive material, and, where applicable, an intermediate reflecting layer 15 for reflecting the read beam. The optical valve further includes two electrodes 3 and 6 for applying an AC voltage from a generator 7 to the terminals of these layers of material, a support sheet 10 being placed on the liquid crystal layer side for supporting the electrode 3. This cell receives write radiation 9 on its photoconductive side having the waveform shown in FIG. 3. The electrode 6 and the assembly constituted by the electrode 3 and the support sheet 10 must both be transparent to the radiation of the write beam 9. The electrode 3 and the sheet 10 must also be transparent to the beam 12 which is to be reflected. The electrodes 3 and 6 may be made of layers which are a few tens of a micrometer thick deposited by cathode sputtering tin oxide, indium oxide, or a mixture thereof. If the write beam is an X-ray, the electrode 6 is preferably made of a low atomic weight metal deposited in a layer which is a few thousands of angström units thick. The optical valve could also operate in transmission, in which case the layer 15 would be omitted.

The liquid crystal layer 2 may, for example, be constituted by a mesomorphic material having a nematic phase at ambient temperature and about 15 micrometers thick. The mesomorphic material is chosen to have positive or negative dielectrical anisotropy depending on the desired effect. If a memory liquid crystal layer is required, a mixture of nematic and cholesteric materials is used. If the liquid crystal layer has a helical structure, the read radiation is linearly polarized and the analyzing means are linear analyzing means. The relative dielectric constant of such materials is about 10.

Figure 10:
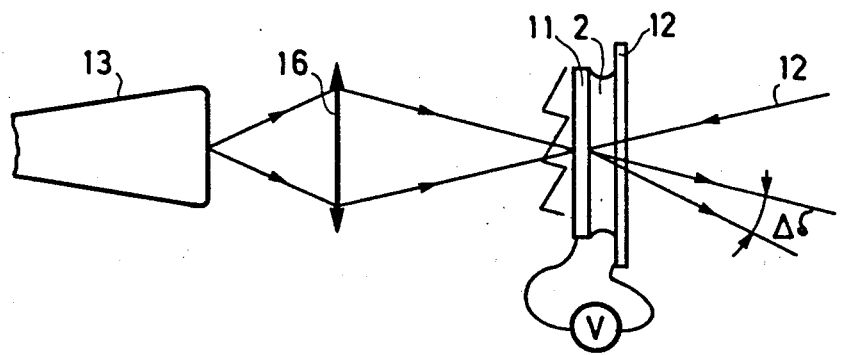
FIG. 10 shows a variant embodiment.

The photoconductive material constituting the sheet 11 in the example of FIG. 10 is an oxide of bismuth-silicon (BSO). It may advantageously be chosen to be transparent in at least a portion of the visible light spectrum. Its resistivity in the absence of illumination is about $10^{14}$ ohm.cm and it drops by a factor of about 1000 for 1 mW of illumination in the near ultraviolet. These materials may be in the form of sheets which are sufficiently thick to act as supporting members in the optical valve. Further, the photoconductive material used includes traps which are impurity atoms distributed uniformly throughout the volume of the material. They are capable of capturing electrons or holes which diffuse from the points at which they are created by photon excitation. When the photoconductive sheet is illuminated, incident photons of sufficient energy are capable of creating electron-hole pairs. If an electric field is applied to the sheet, the electrons and the holes are drawn towards the electrodes. For a DC field, the electrons are drawn to the positive electrode while the holes are drawn to the negative electrode. The charge carriers created in the material by ionizing radiation or by photon excitation are trapped in a region of the volume where a space charge appears which substantially reduces transport of the electric charges. When an AC voltage of high enough frequency is applied to the photoconductor, there is not enough time to set up a space charge in the photoconductor and the current measured in the external circuit is close to the initial current Io. Under these conditions, the voltage transferred to the liquid crystal is considerable and contributes to effective control of the optical modulation which the liquid crystal is being used to provide. It is thus possible to generate the grating for deflecting the infrared beam 12. An image I(x) having the same shape as the curve v=f(x) shown in FIG. 3 an a spacing Λ can thus be generated, as indicated in FIG. 10, by means of a cathode ray tube (CRT) 13 whose front face image is projected onto the photoconductor. The brightness of the image may be amplified by means of a micro-channel amplifier.

Such an optical valve has the following advantages, in use, when compared with the first embodiment described:

there is no need to etch the electrodes;

two-dimensional operation is obtained by changing the orientation of the image on the CRT; and The spacing $(\Lambda)_{Min}$ may be less than 100 μm (depending on the space resolution of the valve).

A deflector device in accordance with the invention is applicable to the following systems:

active imaging, as a high-speed random access scanner and prepointing device usable both for reception and for transmission; and electrically or optically controlled devices for correcting wavefronts.

What is claimed is:

1. A static deflector device for deflecting a polarized infrared beam, said device being for use with a source of a polarized infrared beam, and comprising:

deflector means for deflecting said beam, said deflector means comprising a liquid crystal layer and modulator means for modulating said liquid crystal layer; and control signal generator means for generating a control signal and applying said control signal to control said modulator means, thereby creating local variations of refractive index in said layer in such a manner as to form a beam diffraction grating of adjustable spacing in said liquid crystal layer;

said control signal being periodic in space having a staircase waveform varying from a minimum value to a maximum value in a continuous progression of N steps per period in such a manner that the maximum value causes an incident beam to be phase-shifted by 2π;

said modulator means for modulating said liquid crystal layer comprising electrodes disposed on both faces of said layer, the electrodes on the incident face of the layer being transparent, electrically isolated, and disposed in zones that are equidistant from one another and which are separated by interelectrode spaces which, at least in one direction, range in size between 1 and 10 micrometers, a common electrode being disposed on the other face of said liquid crystal layer.

2. A device according to claim 1, wherein the interelectrode space is 5 micrometers.

3. A device according to claim 1, wherein the width of the electrodes is in the range 5 micrometers to 25 micrometers.

4. A device according to claim 1, wherein the common electrode is an infrared reflecting electrode.

5. A device according to claim 1, wherein the electrodes on the incident face are made of germanium.

6. A device according to claim 1, wherein the electrodes disposed on the incident face are in the form of parallel strips, with each of the electrodes being raised to a potential relative to the common electrode which corresponds to one of the steps in the control signal, thereby providing a periodic distribution of potential at said electrodes corresponding to the control signal.

7. A device according to claim 6, including a second liquid crystal layer disposed on the other side of the common electrode, said common electrode being transparent, the outer face of the second liquid crystal layer including electrodes in the form of parallel strips which are isolated and transparent, said electrodes extending in a direction perpendicular to the direction in which the electrodes on the first liquid crystal layer extend, and the infrared beam being deflected on passing through the device.

8. A device according to claim 1, wherein the electrodes disposed on the incident face are situated in spots which are equidistant from one another in two perpendicular directions and separated by interelectrode spaces of 1 to 10 micrometers, each of the electrodes being raised relative to the common electrode to a potential corresponding to one of the steps of the control signal, the electrode potentials being distributed in a periodic manner corresponding to said control signal.

9. A device according to claim 8, wherein the control signals are phase shifted in a regular manner from one line of electrodes to the next.

10. A device according to claim 1, wherein the liquid crystal layer is disposed between the first face of a photoconductive sheet whose other face supports a first electrode, and the first face of a support sheet which supports a second electrode, the control signal being provided by write radiation applied to the photoconductive sheet side of the liquid crystal layer.

11. A device according to claim 10, including an intermediate reflecting layer between the photoconductive sheet and the liquid crystal layer.

12. A device according to claim 10, wherein the first and second electrodes are constituted by layers of tin oxide deposited by cathode sputtering.

13. A device according to claim 10, wherein the first and second electrodes are constituted by layers of indium oxide deposited by cathode sputtering.

14. A device according to claim 11, including a cathode ray tube, wherein the image on the face of the cathode ray tube is projected onto the photoconductive sheet thereby constituting said write radiation.

15. A device according to claim 1, wherein the liquid crystal layer is made of Pentyl-CyanoBiphenyl.

* * * * *